United States Patent [19]

Hellnick et al.

[11] 4,375,708

[45] Mar. 8, 1983

[54] NON-INDEXING MACHINING METHOD AND APPARATUS

[75] Inventors: Dieter H. Hellnick; Michael C. Sterioff, both of Houston, Tex.

[73] Assignee: Jo-Way Tool Company, Inc., Houston, Tex.

[21] Appl. No.: 189,065

[22] Filed: Sep. 22, 1980

[51] Int. Cl.³ .................. B23B 1/00; B23B 29/26; B23G 1/22

[52] U.S. Cl. .................. 10/87; 29/566; 82/1 C; 408/23; 408/188; 408/211; 408/219

[58] Field of Search .................. 408/1, 23, 188, 148, 408/211, 216, 219; 10/87, 101 R; 82/1 C; 29/27 C, 33 T, 566

[56] References Cited

U.S. PATENT DOCUMENTS 2,413,406  12/1946  Dooling .................. 10/87 X
3,169,426   2/1965  Renoux .................. 10/87 X Primary Examiner—Z. R. Bilinsky

[57] ABSTRACT

Disclosed is a method and apparatus for machining a tubular workpiece to form an internally threaded coupling having a faced and chamfered end and a tapered counterbore. The method includes forming a tool support bar having a longitudinal axis and supporting on the tool support bar first and second tools having cutting edges and a thread cutting tool. The method further includes rotating the workpiece about its longitudinal axis and positioning the tool support bar relative to the workpiece such that the axis of the tool support bar and the workpiece lie in one plane and are substantially parallel to each other. The method further includes moving the support bar to chamfer and face the end of the workpiece with the first tool, moving the tool support bar to taper and counterbore the interior of the workpiece with the second tool, and moving the support bar to thread the tapered interior of the workpiece with the thread cutting tool.

2 Claims, 8 Drawing Figures

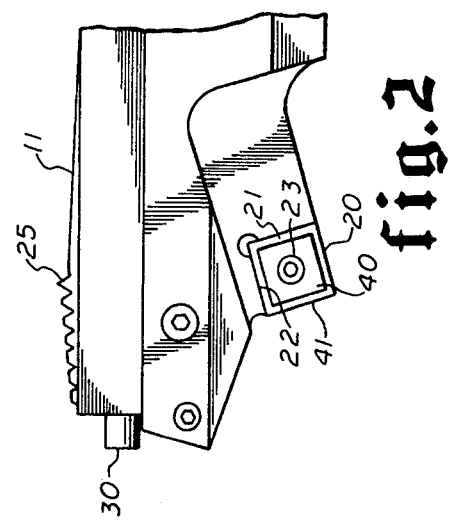
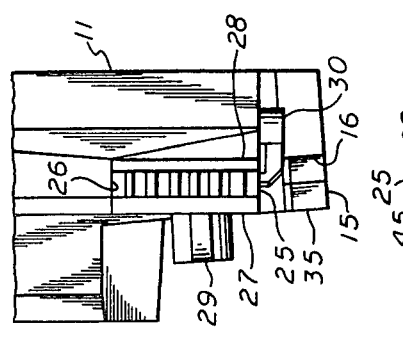
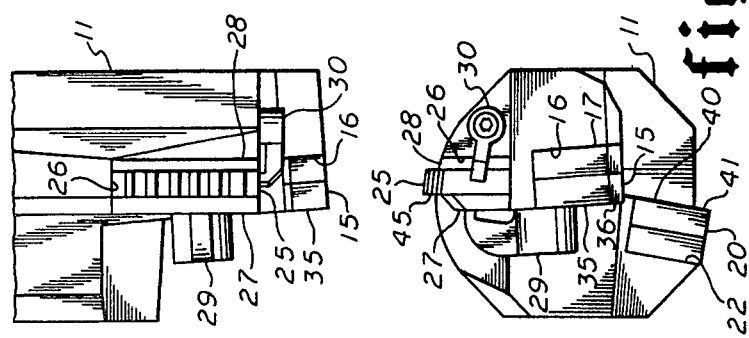
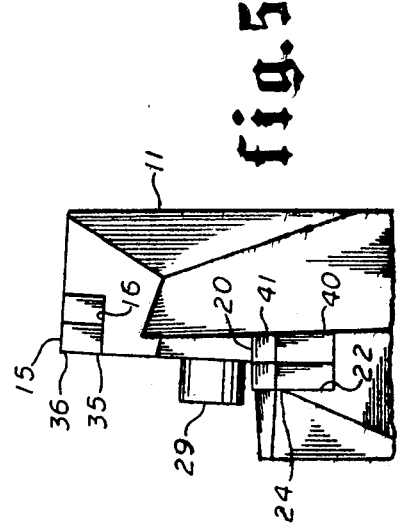
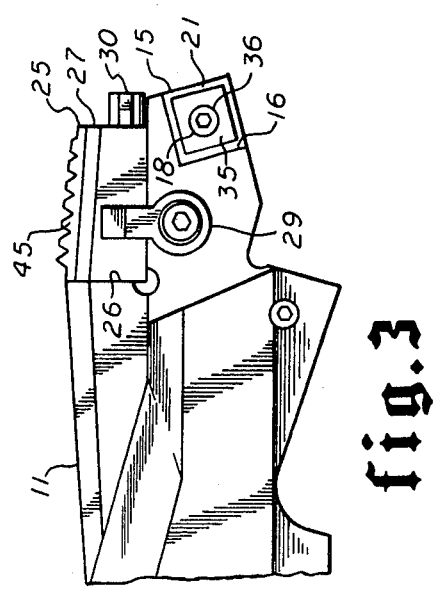

NON-INDEXING MACHINING METHOD AND APPARATUS

BACKGROUND OF THE INVENTION

A. Field of the Invention

This invention relates to methods and apparatus for machining tubular workpieces to form couplings, and more particularly, to a method and apparatus for machining a tubular workpiece to form an internally threaded coupling having a faced and chamfered end and a tapered and counterbored interior without reversing the direction of rotation of the workpiece or indexing into position plural machining tools.

B. Description of the Prior Art

Couplings, which are used to connect the threaded pipe or other tubular goods, have at least one chamfered and faced end and a threaded tapered bore. In order to protect the thread from damage, couplings are typically counterbored.

At Jo-Way Tool Company, couplings are presently machined from tubular stock with the use of numerically controlled machines, which include a chuck for supporting and rotating the tubular stock about its longitudinal axis and means for manipulating tools to machine the tubular stock to form the various surfaces of the coupling. The tool manipulating means includes a turret adapted to support and index into position a plurality of tools, and means for moving the turret axially and radially relative to the axis of the workpiece.

Conventionally, it requires at least three tools to machine a coupling; a tool for chamfering and facing the end of the tubular stock; a tool for tapering and counterboring the interior of the tubular stock; and a tool for threading the tapered interior of the tubular stock. The three tools are mounted at different stations of the turret of the numerically controlled machine. In operation, the first tool is indexed into position where it is manipulated to chamfer and face the end of the workpiece. The first tool is then moved clear of the workpiece and the turret is indexed to bring the second tool into position, whereupon the second tool is manipulated to taper and counterbore the interior of the workpiece. Then, the second tool is moved clear of the workpiece and the turret is indexed to bring into position the third tool, which is manipulated to thread the tapered interior of the workpiece. As is apparent from the foregoing, a substantial portion of the time involved in maching a coupling is devoted to moving the tool clear of the workpiece and indexing them to various positions. The time spent in clearing and indexing the tools is wasted because during such time the workpiece is not being machined. Moreover, the large motions required in clearing and indexing the tools increases the wear on the numerically controlled machine. Experience has shown that approximately 20% of all maintenance downtime on numerically controlled machines is directly attributable to turret indexing problems.

In an effort to overcome the above described shortcomings, a tool was developed that included a tool holder that supported a thread cutting tool and a cutting tool adapted to machine both the face and chamfer and the taper and counterbore. That tool did eliminate the need to clear and index the turret; however, because of tool design geometry, the cutting tool thereof was required to have a positive leading cutting edge that was adapted to cut in two directions. The positive leading cutting edge and the bidirectional feature of the prior tool required that the speed of rotation of the workpiece be reduced to the point where the time saved by not indexing the turret was less than the time added to the actual machining of the workpiece. Additionally, the cutting element of the prior tool was subject to excessive wear and frequent breakage, and consequently had to be replaced frequently, which resulted in poor quality work and excessive machine down time. The net result of the use of that tool was a decrease in efficiency and an increase in expense compared to that of the conventional method and apparatus.

It is therefore an object of the present invention to provide an improved method and apparatus for machining a coupling from a tubular workpiece wherein the workpiece is rotated in one direction of rotation about its longitudinal axis and the maching steps are performed without clearing and indexing into position multiple tools.

SUMMARY OF THE INVENTION

Briefly stated, the foregoing and other objects and advantages of the present invention are accomplished by providing a tool support bar for supporting the first having a cutting edge adapted to chamfer and face the end of a tubular workpiece, a second cutting tool having a cutting edge adapted to taper and counterbore the interior of the workpiece, and a thread cutting tool adapted to thread the tapered interior of the workpiece. The first and second tools have negative trailing cutting edges and faces that are oriented in substantially opposite directions, such that the face of the first cutting tool is directed against the direction of rotation of the external surface of the workpiece and the face of the second tool is directed against the direction of rotation of the interior surface of the workpiece.

The method further includes rotating the workpiece about its longitudinal axis, positioning the tool support bar relative to the workpiece such that the axis of the tool support bar and the workpiece lie in one plane and are substantially parallel to each other, moving the tool support bar in the plane of the axes to chamfer and face the end of the workpiece with the first tool, moving the tool support bar in the plane of the axes to taper and counterbore the interior of the workpiece with the second tool, and moving the support bar in the plane of the axes to thread the tapered interior of the workpiece with the thread cutting tool.

BRIEF DESCRIPTION OF THE DRAWINGS

FIG. 1 is an end view of the tool bar of the present invention with the tools of the present invention supported thereby.

FIG. 2 is a partial side view of the tool support bar of the present invention.

FIG. 3 is a view of the opposite side of the tool support bar of the present invention.

FIG. 4 is a partial top view of the tool support bar of the present invention.

FIG. 5 is a partial bottom view of the tool support bar of the present invention.

DESCRIPTION OF PREFERRED EMBODIMENT

Figure 6:
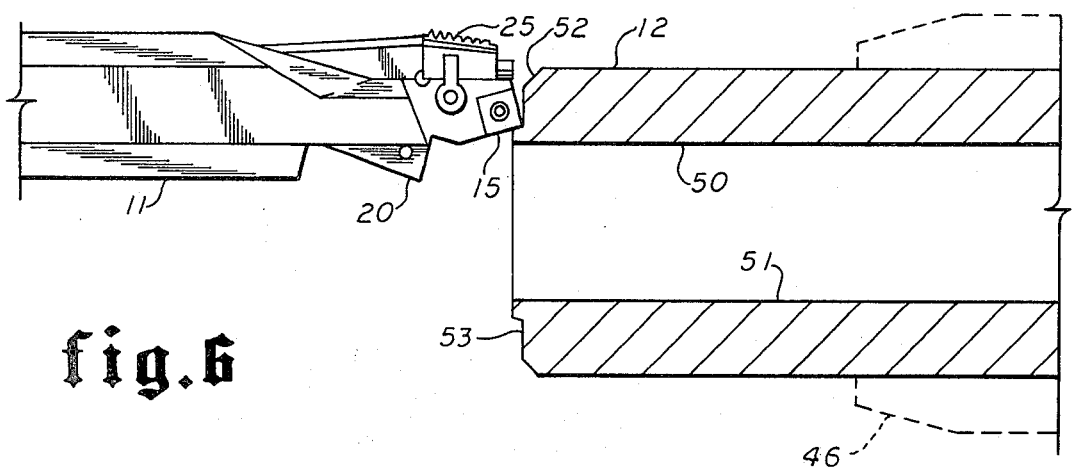
FIG. 6 is a partial section view showing the operation of the apparatus of the present invention to chamfer and face the end a tubular workpiece.

Turning now to the drawings, and first to FIGS. 1–5, the tool support bar of the present invention as designated by the numeral 11. Tool support bar 11 is formed from a cylindrical member having a longitudinal axis, and is adapted for use with a numerically controlled machine. A numerically controlled machine includes the means for rotating a workpiece about its longitudinal axis and means supporting tool support bar 11 such that the axis thereof is substantially parallel to the longitudinal axis of the workpiece and for moving tool support bar 11 axially and radially with respect to the workpiece in the plane defined by the axes of tool support bar 11 and the workpiece.

Tool support bar 11 is configured to support thereon the first cutting tool 15, a second cutting tool 20, and a thread cutting tool 25. First cutting tool 15 and second cutting tool 20 are substantially identical square inserts of a hard material, as for example, tungsten carbide. Each insert of cutting tools 15 and 20 is double sided and has 4 cutting edges on each side. Thus, when an edge of an insert becomes dull or damaged, the insert may be rotated to present a new cutting edge. Each insert of cutting tools 15 and 20 includes a chip breaker 21, which functions to eliminate long strips of cut material.

First cutting tool is supported by tool support bar 11 in a recess 16 and is held in place in recess 16 by a screw 18, which is threaded into tool support bar 11. First cutting tool 15 is further supported a square spacer 17.

Second cutting tool 20 is supported by tool support bar 11 axially behind and radially outboard from first cutting tool 15 in a recess 22. Second cutting tool 20 is secured in recess 22 by a screw 23 and is further supported by a spacer 24.

Thread cutting tool 25 is supported by tool support bar generally radially opposite second cutting tool 20 in a recess 26. Thread cutting tool 25 is held in recess 26 between a chip chip breaker 27 and a base shim 28 by a pair of clips 29 and 30.

First cutting tool 15 is positioned on tool support bar so as to present a face 35 in the direction substantially against the rotation of the workpiece. As shown best in FIG. 1, face 35 has a negative rake whereby only cutting edge 36 contacts the workpiece. As best seen FIG. 3, first cutting tool 15 has a negative trailing cutting edge 36, which tends to direct chips away from first cutting tool 15. As further shown in FIG. 4, face 35 of first cutting tool 15 has a negative rake relative to the axis tool support bar 11.

As best shown in FIGS. 1 and 2, second cutting tool 20 has a face 40 that is directed substantially opposite face 35 of first cutting tool 15 and against the direction of rotation of the interior of the workpiece. Second cutting tool 20 has a negative trailing cutting edge 41 and is raked negatively with respect to the workpiece and the axis of the tool support bar 11.

Thread cutting tool 25 has a face 45 that is directed against the direction of rotation of the workpiece radially opposite second tool 20 Thread cutting tool 25 is thus adapted to cut the interior of the workpiece radially opposite second cutting tool 20. Face 45 of thread cutting tool 25 has substantially zero rake.

Figure 7:
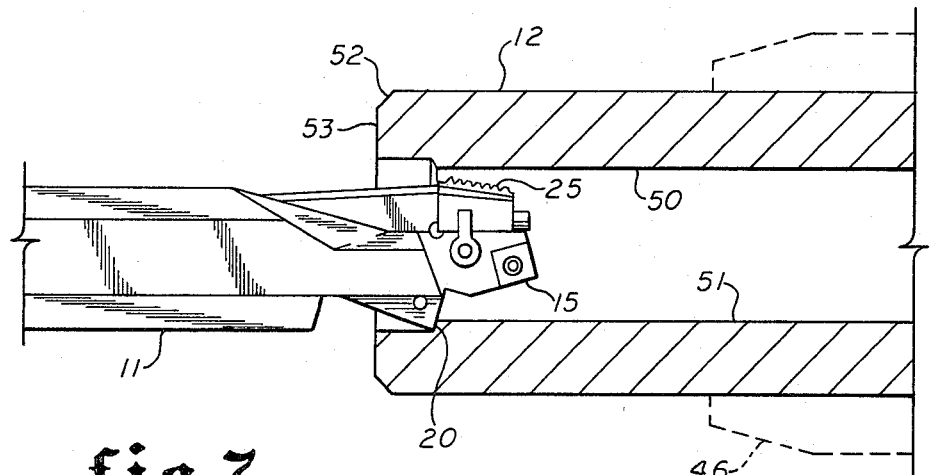
FIG. 7 is a partial section view showing the operation of the apparatus of the present invention to taper and counterbore the tubular workpiece.
Figure 8:
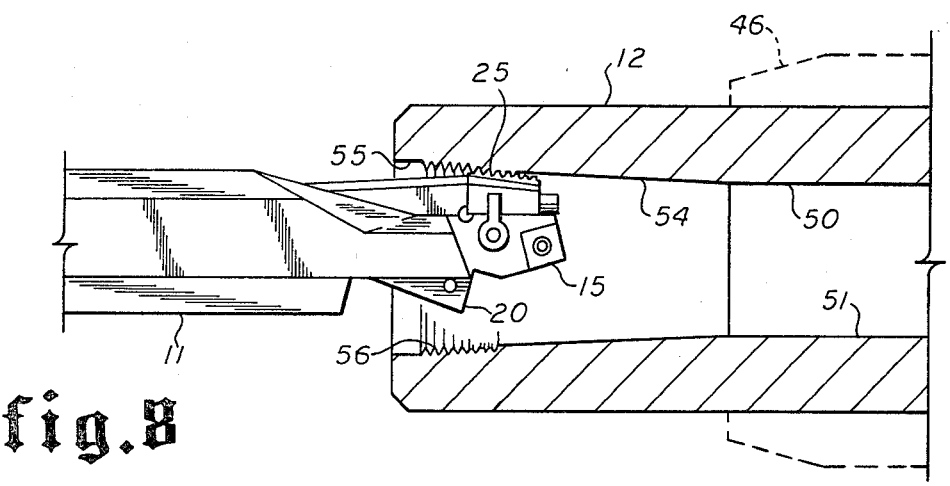
FIG. 8 is a partial section view showing the operation of the apparatus of the present invention to thread the tapered interior of the tubular workpiece.

Referring now to FIGS. 6–8, the method of the present invention is illustrated further to show the machining of a tubular workpiece 12 to form a coupling. Work piece 12 is supported for rotation about its longitudinal axis by chuck means, designated in phantom as 46. In the preferred embodiment, workpiece 12 is rotated counter clockwise, or such that upper section 50 of workpiece 12 moves in a direction into the paper and lower section 51 moves in a direction out of the paper. Tool support bar 11 is positioned such that its axis is parallel to that of workpiece 12 and is moveable radially and axially relative to workpiece 12 in the plane containing the axis of tool support bar 11 and workpiece 12. As shown in FIG. 6, tool support bar 11 is moved radially inwardly and axially outwardly with respect to upper portion 50 of workpiece 12 to form a chamfer 52 and then radially inwardly to form face 53 with first cutting tool 15. Upon completion of face 53, tool support bar 11 is inserted into the interior of workpiece 12 such that second cutting tool 20 engages lower portion 51 of workpiece 12 to form a taper 54 and a counterbore 55. Upon completion of taper 54 and counterbore 55, tool support bar 11 is moved radially upwardly within workpiece 12 such that thread cutting tool 25 engages upper portion 50 of workpiece 12 to form tapered threads 56. It will of course be recognized by those skilled in the art that the facing and chamfering step may be performed subsequent to tapering or threading the workpiece.

From the foregoing, it may be seen that the method and apparatus of the present invention are effective to machine a coupling by rotating a tubular workpiece in one direction and without the need to index several cutting tools into position. The method and apparatus therefore reduce substantially the time and expense associated with the production of couplings.

What is claimed is:

1. A method for machining a tubular workpiece to form an internally threaded coupling having a faced and chamfered end and a tapered and a counterbored interior, which comprises:

(a) forming a tool support bar having a longitudinal axis, a first tool having a face and a cutting edge supported by said tool support bar with said face oriented a first direction, a second tool having a cutting edge supported by said tool support bar with said second tool face oriented in a direction substantially opposite the direction of said first tool face, and a thread cutting tool having a face supported by said tool support bar with said thread cutting tool face oriented in substantially the same direction as said first tool face;

(b) rotating said workpiece in a single direction of rotation throughout steps d-f about the longitudinal axis thereof;

(c) positioning said tool support bar relative to said workpiece such that the axes of said tool support bar and said workpiece lie in one plane and are substantially parallel to each other and said first tool face is directed substantially against the direction of rotation of the exterior surface of said workpiece;

(d) moving said tool support bar in said plane with the axis thereof parallel to the axis of said workpiece to chamfer and face the end of said workpiece with said first tool;

(e) moving said tool support bar in said plane with the axis thereof parallel to the axis of said workpiece to taper and counterbore the interior of said workpiece with said second tool;

(f) and moving said tool support bar in said plane with the axis thereof parallel to the axis of said workpiece to thread the tapered interior of said workpiece.

2. The method as claimed in claim 1, wherein: said first and second cutting tools are mounted on said tool support bar to define negative trailing cutting edges.

* * * * *